United States Patent [19]

Nilssen

[11] Patent Number: 4,874,989

[45] Date of Patent: Oct. 17, 1989

[54] ELECTRONIC BALLAST UNIT WITH INTEGRAL LIGHT SENSOR AND CIRCUIT

[76] Inventor: Ole K. Nilssen, Caesar Dr., Rt. 5, Barrington, Ill. 60010

[21] Appl. No.: 940,600

[22] Filed: Dec. 11, 1986

[51] Int. Cl.[4] .......................................... H05B 41/36
[52] U.S. Cl. ...................................... 315/151; 315/56; 315/158; 315/307; 315/DIG. 5; 361/377
[58] Field of Search ................. 315/117, 151, DIG. 7, 315/DIG. 5, DIG. 4, 158, 156, 157, 307, 56; 250/210, 214 D, 239; 361/377

[56] References Cited

U.S. PATENT DOCUMENTS

| 3,679,931 | 7/1972 | Powell | 315/154 |
|---|---|---|---|
| 3,681,654 | 8/1974 | Quinn | 315/151 |
| 3,901,813 | 8/1975 | Potopinski | 315/156 |
| 4,207,498 | 6/1980 | Spira et al. | 315/201 |
| 4,343,032 | 8/1982 | Schwartz | 362/147 |
| 4,350,935 | 9/1982 | Spira et al. | 315/208 |
| 4,417,179 | 11/1983 | Fujimura et al. | 315/151 |
| 4,463,284 | 7/1984 | Tamura et al. | 315/151 |
| 4,464,606 | 8/1984 | Kane | 315/151 |
| 4,529,912 | 7/1985 | Northup et al. | 315/151 |
| 4,533,854 | 8/1965 | Northup | 315/151 |
| 4,595,860 | 6/1986 | Taylor | 315/151 |
| 4,611,266 | 9/1986 | Schwartz | 362/226 |
| 4,731,551 | 3/1988 | Gibbs et al. | 315/159 X |

*Primary Examiner*—James J. Groody
*Assistant Examiner*—Mark R. Powell

[57] ABSTRACT

An electronic ballast powers fluorescent lamps in a lighting fixture with a current of magnitude related to the frequency of the ballast output voltage. The ballast comprises self-oscillating inverter means wherein the frequency of oscillation can be influenced by receipt of a control signal at a control input connected in circuit with the inverter's positive feedback circuit. The ballast also comprises optical sensor means so positioned and constituted as to sense the light level within the lighting fixture and to provide a control signal commensurate with the light level. This control signal is then applied to the control input in such manner as to regulate the inverter frequency as a function of the light level, thereby correspondingly to regulate the magnitude of the current fed to the fluorescent lamps. By providing a threshold means in combination with high gain in the control loop, the fixture light level may be accurately maintained at any desired value substantially regardless of any changes in magnitude of power line voltage and/or in lamp efficacies.

20 Claims, 3 Drawing Sheets

ELECTRONIC BALLAST UNIT WITH INTEGRAL LIGHT SENSOR AND CIRCUIT

BACKGROUND OF THE INVENTION

1. Field of Invention

The invention relates to ballasts for gas discharge lamps, particularly of a kind comprising built-in sensor means operative to sense lamp light output and to controllably maintain it at any desired level.

2. Elements of Prior Art

It is well known that significant improvements in overall cost-effectivity of the lighting function can result from appropriately controlling the level of light output from lighting fixtures used for general lighting in offices and the like.

Fluorescent lamp ballasting systems adapted to permit control of light output level on a systems basis presently do exist—as for instance in accordance with U.S. Pat. Nos. 4,207,498 and 4,350,935 to Spira et al.

However, there are significant complexities associated with practical applications of such light level control systems; and, in spite of the very significant improvements potentially available in overall lighting efficacy, such light control systems have not gained wide acceptance.

3. Inventive Rationale

Much of the value available from a light control system may be attained by control of each individual lighting fixture. That way, for instance, light output from each fixture could be kept constant irrespective of any variations in the magnitude of the power line voltage and/or regardless of changes in luminous efficacy of the fluorescent lamp(s) used in the fixture.

To make this kind of approach commercially feasible, the present invention provides for a ballast having a built-in light sensing means which is so positioned and arranged that, when this ballast is built into a lighting fixture, its light sensor intercepts a proportional part of the light within the fixture and then causes the ballast power output to be so controlled as to maintain the light within the fixture at a desired level.

SUMMARY OF THE INVENTION

Objects of the Invention

An object of the present invention is that of providing means whereby the light output level of a lighting fixture may be effectively and automatically controlled.

Another object is that of providing a gas discharge lamp ballast having built-in means for sensing the light output produced by the gas discharge lamp, thereby automatically to control that light output in accordance with a desired purpose.

Still another object is that of providing a cost-effective means of controllably regulating the output of a gas discharge lamp ballast in such manner as to maintain a substantially constant lamp light output irrespective of any variations in the magnitude of the power line voltage and/or regardless of any changes in the lamp's luminous efficacy.

These as well as other objects, features and advantages of the present invention will become apparent from the following description and claims.

BRIEF DESCRIPTION

In its preferred embodiment, the present invention constitutes a power-line-operated inverter-type ballast that provides to one or more fluorescent lamps in a lighting fixture a high-frequency current the magnitude of which is inversely related to the frequency of the ballast output voltage. The ballast comprises a self-oscillating inverter wherein the frequency of oscillation can be influenced by receipt of a control signal at a pair of control terminals connected in circuit with the inverter's positive feedback circuit. The ballast also comprises built-in optical sensor means so positioned and constituted as to sense the light level within the lighting fixture within which the ballast is mounted and to provide a control signal commensurate with that light level. This control signal is then applied to the control terminals in such manner as to regulate the inverter frequency as a function of the light level, thereby correspondingly to regulate the magnitude of the current fed to the fluorescent lamps. By providing a threshold means in combination with high gain in the control loop, the fixture light level may be accurately maintained at any desired value substantially regardless of any changes in magnitude of power line voltage and/or in lamp efficacies.

The inverter's positive feedback is attained by way of saturable current transformer means, and control of inverter frequency is attained by providing more or less heat to the saturable magnetic material of the current transformer means, thereby correspondingly to decrease or increase the saturation limits of this magnetic material; which, in turn, correspondingly increases or decreases the frequency of inverter oscillation.

DESCRIPTION OF THE PREFERRED EMBODIMENT

Description of the Drawings

Figure 1:
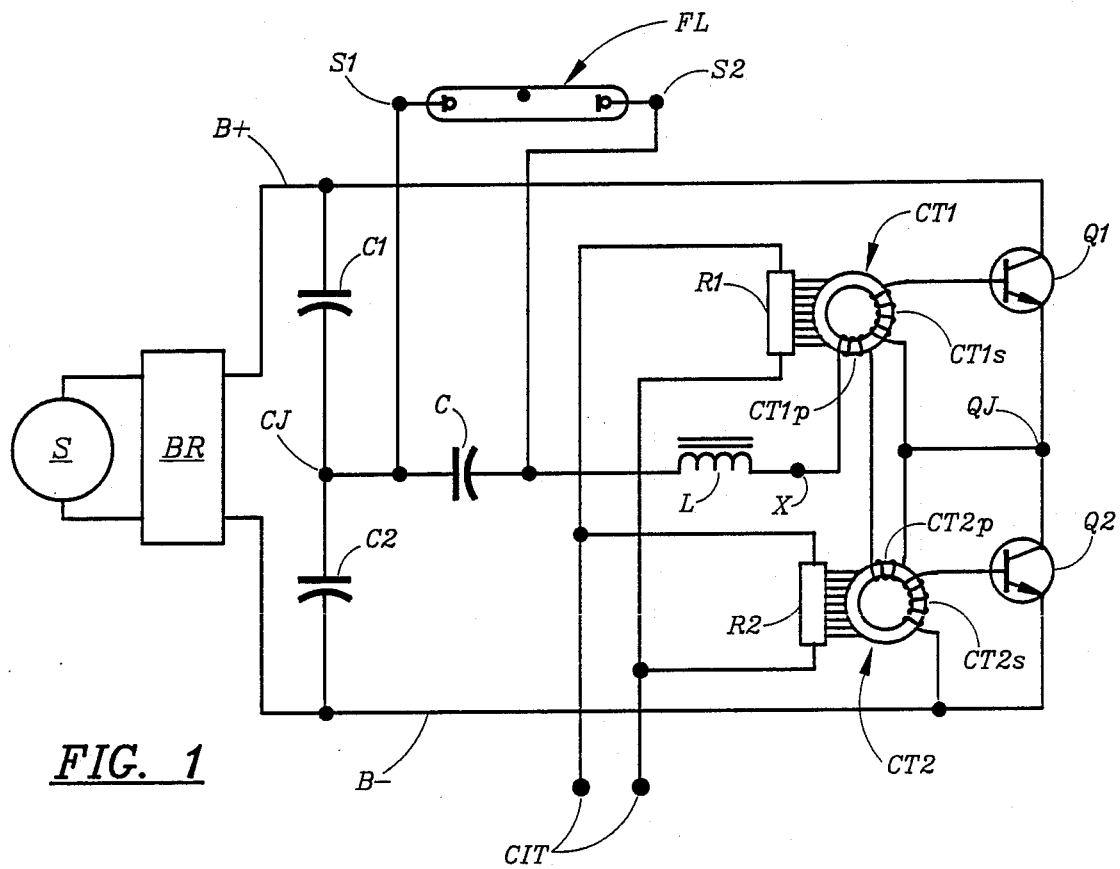
FIG. 1 diagrammatically illustrates a power-line-operated self-oscillating inverter-type ballast circuit with saturable transformer means in its positive feedback path and with electrical input means for affecting control of the inversion frequency.

In FIG. 1, a source S of 120 Volt/60 Hz voltage is applied to a full-wave bridge rectifier BR, the unidirectional voltage output of which is applied directly between a B+ bus and a B+ bus, with the positive voltage being connected to the B+ bus.

Between the B+ bus and the B− bus are connected a series-combination of two transistors Q1 and Q2 as well as a series-combination of two energy-storing capacitors C1 and C2.

The secondary winding CT1s of positive feedback current transformer CT1 is connected directly between the base and the emitter of transistor Q1; and the secondary winding CT2s of positive feedback current transformer CT2 is connected directly between the base and the emitter of transistor Q2.

The collector of transistor Q1 is connected directly with the B+ bus; the emitter of transistor Q2 is connected directly with the B− bus; and the emitter of transistor Q1 is connected directly with the collector of transistor Q2, thereby forming junction QJ.

One terminal of capacitor C1 is connected directly with the B+ bus, while the other terminal of capacitor C1 is connected with a junction CJ. One terminal of capacitor C2 is connected directly with the B− bus, while the other terminal of capacitor C2 is connected directly with junction CJ.

An inductor L and a capacitor C are connected in series with one another and with the primary windings CT1p and CT2p of transformers CT1 and CT2.

The series-connected primary windings CT1p and CT2p are connected directly between junction QJ and a point X. Inductor L is connected with one of its terminals to point X and with the other of its terminals to one of the terminals of capacitor C. The other terminal of capacitor C is connected directly with junction CJ.

A fluorescent lamp FL is connected, by way of lamp sockets S1 and S2, in parallel circuit across capacitor C.

Respectively, the two current transformers CT1 and CT2 are thermally connected with heating resistors R1 and R2; which two resistors are parallel-connected across control input terminals CIT.

Values and designations of the various parts of the circuit of FIG. 1 are listed as follows:

| | |
|---|---|
| Output of Source S: | 120 Volt/60 Hz; |
| Bridge rectifier BR: | a bridge of four 1N4004's; |
| Capacitors C1 & C2: | 100uF/100 Volt Electrolytics; |
| Transistors Q1 & Q2: | Motorola MJE13002's; |
| Capacitor C: | 15nF/1000 Volt(High-Q); |
| Inductor L: | 130 turns of three twisted strands of #30 wire on a 3019P-L00-3C8 Ferroxcube Ferrite Pot Core with a 120 mil air gap; |
| Transformers CT1 & CT2: | Wound on Ferroxcube Toroids 213T050 of 3E2A Ferrite Material with three turns of #26 wire for the primary windings and ten turns of #30 wire for the secondary windings; |
| Fluorescent Lamp FL: | Sylvania Octron F032/31K; |
| Resistors R1 & R2: | 0.2k Ohm/1 Watt Wirewound's. |

The frequency of inverter oscillation associated with the component values identified above—with no power supplied to resistors R1 and R2—is approximately 33 kHz.

Figure 2:
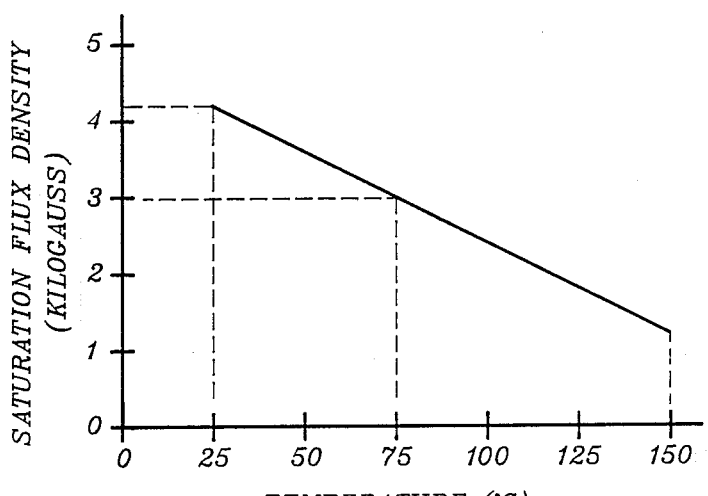
FIG. 2 illustrates the effect of temperature on the saturation characteristics of the magnetic material used in the saturable transformer means.

FIG. 2 shows the relationship between temperature and saturation flux density of the Ferroxcube 3E2A ferrite material used in feedback current transformers CT1 and CT2.

Figure 3:
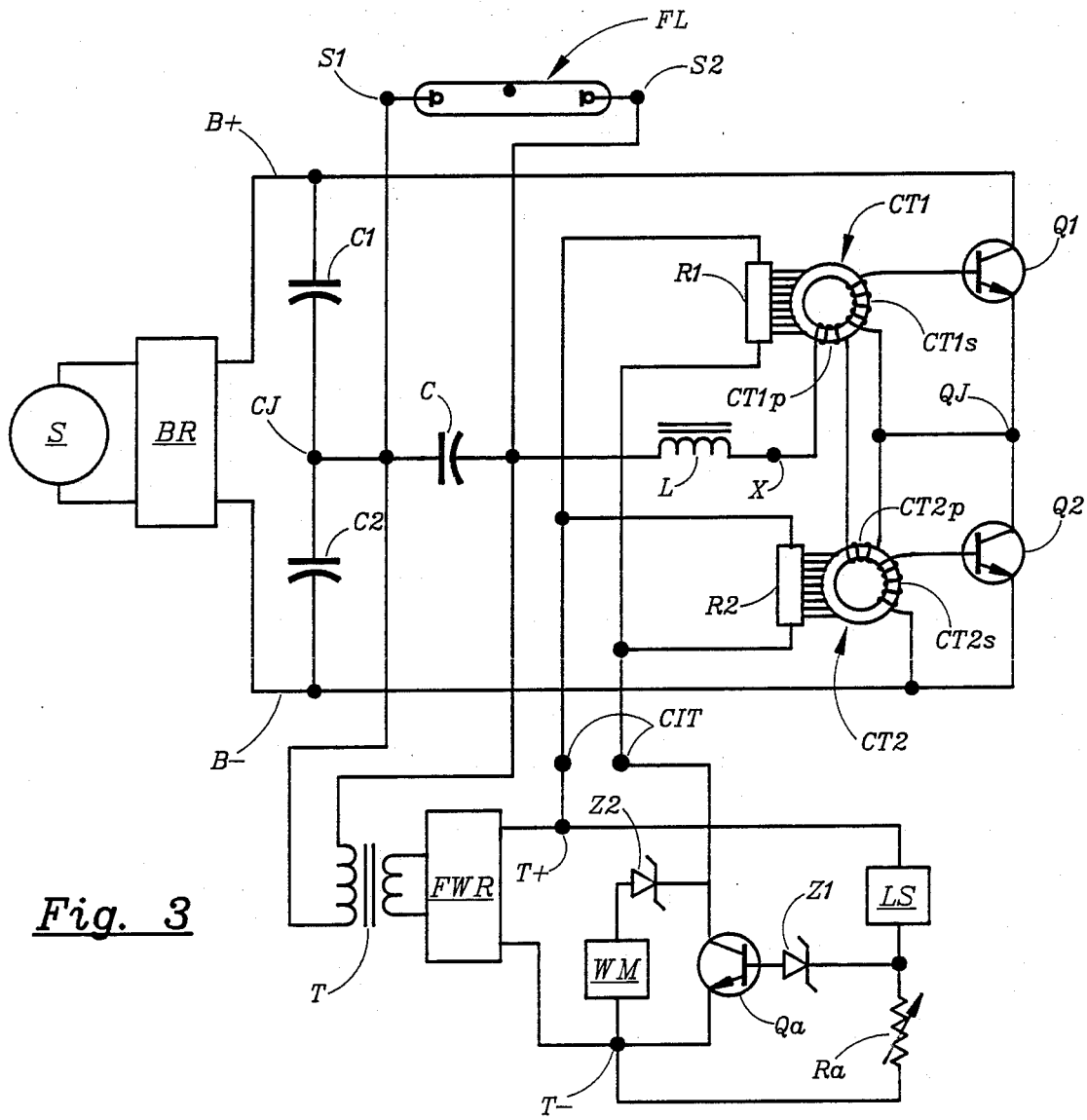
FIG. 3 provides a schematic circuit diagram of the preferred embodiment of the present invention, showing the inverter-type ballast circuit of FIG. 1 combined with optical sensor means and control feedback means operable to keep constant the light output from a fluorescent lamp.

FIG. 3 shows the inverter-type ballast circuit of FIG. 1 arranged such as to provide for automatic control of light output from the fluorescent lamp.

A transformer T is connected with its primary winding across capacitor C; its secondary winding is connected with the AC input terminals of a full-wave rectifier FWR. The positive and negative terminals of the DC output of this rectifier are respectively marked T+ and T−.

A transistor Qa is connected with its collector to the T+ terminal by way of the CIT terminals; and it is connected with its emitter to the T− terminal.

A light sensor LS is connected between the T+ terminal and the cathode of a first Zener diode Z1. The anode of Zener diode Z1 is connected with the base of transistor Qa. An adjustable resistor Ra is connected between the cathode of the Zener diode and the T− terminal.

A second Zener diode Z2 is connected with its cathode to the collector of transistor Qa; and a warning means WM is connected between the anode of Z2 and the T− terminal.

Figure 4:
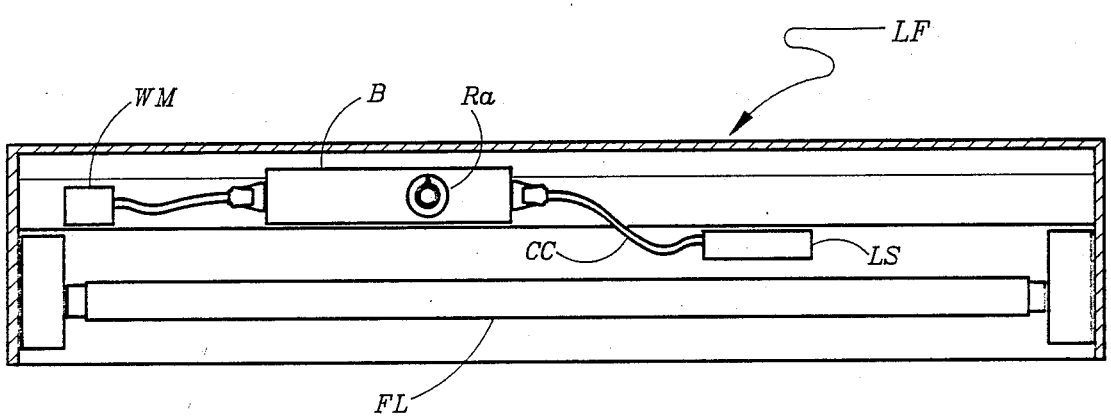
FIG. 4 shows one way of applying the ballast circuit of FIG. 3 to a fluorescent lighting fixture.

FIG. 4 schematically illustrates the use of a ballast B, as made in accordance with the preferred embodiment of FIG. 3, in a lighting fixture LF, which is shown in quasi-cross-section.

The light sensor LS, which is shown as being placed just above the fluorescent lamp FL, is plug-in connected with the ballast B by way of a light-weight connect cord CC. The adjustable resistor Ra is indicated as being accessible for adjustment from the side of the ballast; and warning means WM is indicated as being mounted on the side of the lighting fixture and plugged into the ballast in manner similar to that of the light sensor.

Figure 5:
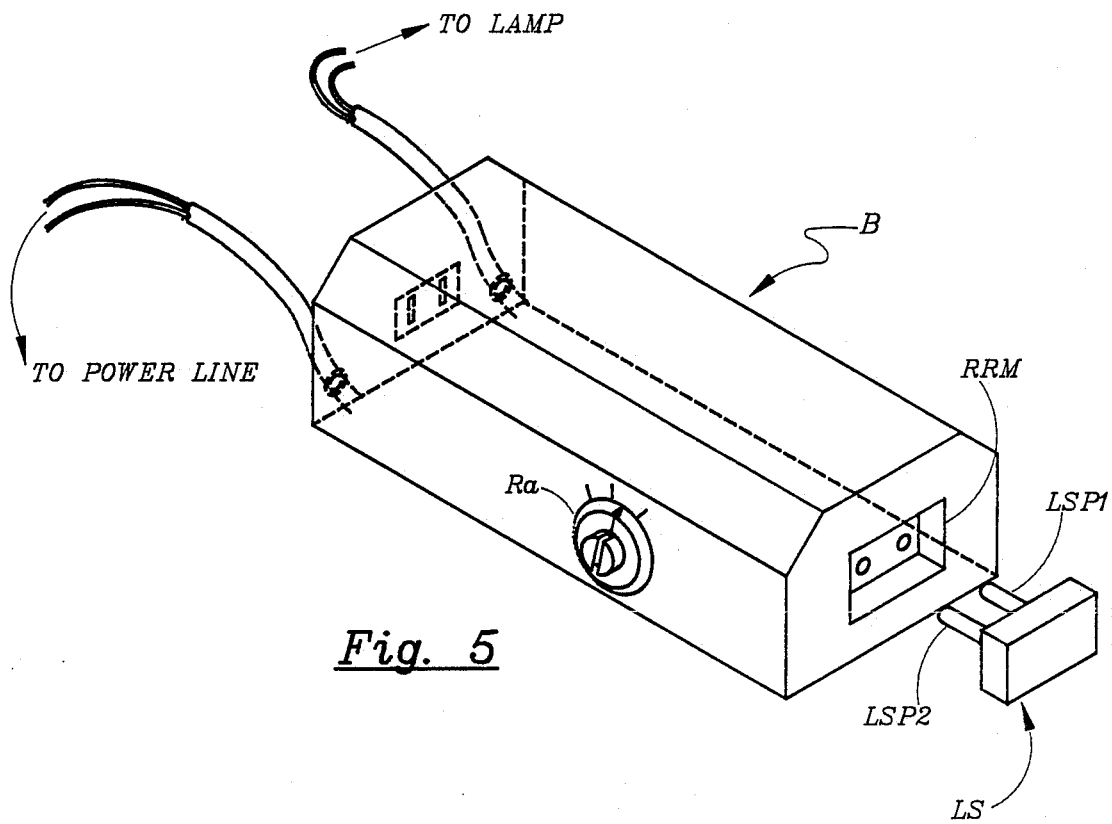
FIG. 5 illustrates the preferred physical embodiment of the ballast circuit of FIG. 3, showing particularly the optical sensor means as an integral part of the ballast structure.

FIG. 5 shows the preferred physically implementation of a complete electronic ballast in accordance with the preferred electrical implementation illustrated in FIG. 3.

In FIG. 5, ballast B comprises recessed receptacle means RRM operative to receive and hold light sensor LS by way of two electrical connect and mechanical support prongs LSP1 and LSP2.

Figure 6:
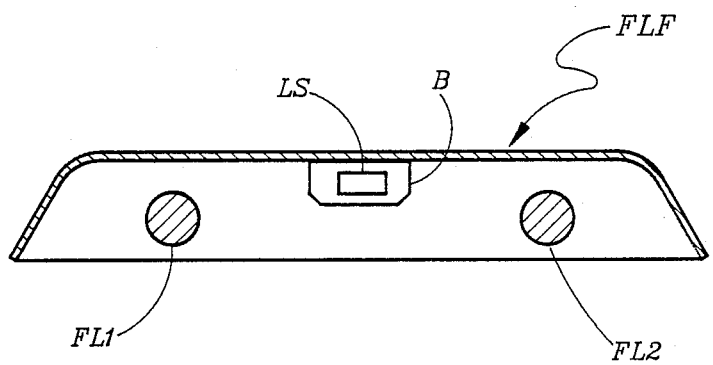
FIG. 6 shows the ballast of FIG. 5 as used in a fluorescent lighting fixture.

FIG. 6 illustrates the use of ballast B in a fluorescent lighting fixture FLF; which is shown in a cross-sectional view, indicating two fluorescent lamps FL1 and FL2. The ballast is positioned in such manner that some of the light from the lamps is intercepted by the ballast's light sensor LS.

DESCRIPTION OF OPERATION

The operation of the circuit of FIG. 1 may be explained as follows.

In FIG. 1, the source S represents an ordinary electric utility power line, the voltage from which is applied directly to the bridge rectifier identified as BR. This bridge rectifier is of conventional construction and provides for the rectified line voltage to be applied to the inverter circuit by way of the B+ bus and the B− bus.

The two energy-storing capacitors C1 and C2 are connected directly across the output of the bridge rectifier BR and serve to filter the rectified line voltage, thereby providing for the voltage between the B+ bus and the B− bus to be substantially constant. Junction CJ between the two capacitors serves to provide a power supply center tap.

The inverter circuit of FIG. 1, which represents a so-called half-bridge inverter, operates in a manner that is analogous with circuits previously described in published literature, as for instance in U.S. Pat. No. Re. 31,758 to Nilssen entitled High Efficiency Push-Pull Inverters.

The inverter circuit is shown without any means for initiating inverter oscillation. However, once B+ power is applied, oscillation can be initiated simply by momentarily connecting a 50 nF capacitor between the B+ bus and the base of transistor Q2.

Or, as is used in many other inverter circuits, an automatic triggering arrangement consisting of a resistor, capacitor, and a Diac may be used.

At a temperature of 25 Degrees Centigrade, the output of the half-bridge inverter is a substantially squarewave 33 kHz AC voltage. This squarewave voltage is provided between point X and junction CJ. Across this squarewave voltage output is connected a resonant or near-resonant L-C series circuit—with the fluorescent lamp being connected in parallel with the tank-capacitor (C) thereof.

The resonant or near-resonant action of the L-C series circuit provides for appropriate lamp starting and operating voltages, as well as for proper lamp current limiting; which is to say that it provides for appropriate lamp ballasting.

(Resonant or near-resonant ballasting has been described in previous publications, as for instance in U.S. Pat. No. 3,710,177 entitled Fluorescent Lamp Circuit Driven Initially at Lower Voltage and Higher Frequency.)

The inverter frequency may be controlled by controlling the temperature of the magnetic cores of the feedback current transformers, as can best be understood by recognizing that—in the inverter circuit of FIG. 1—the ON-time of a given transistor is a direct function of the saturation flux density of the magnetic core in the saturable feedback transformer associated with that transistor. Thus, other things being equal and in view of the relationship illustrated by FIG. 2, the inversion frequency is a substantially proportional function of the temperature of the ferrite cores used in CT1 and CT2.

However, it should also be understood that the transistor ON-time is a substantially inverse proportional function of the magnitude of the voltage presented to the secondary windings of the saturable feedback current transformers by the base-emitter junctions of the two transistors. That is, other things being equal, the inversion frequency is substantially a proportional function of the magnitude of this junction voltage; which is to say, since the magnitude of this junction voltage decreases in approximate proportion to temperature, that the inversion frequency decreases with increasing temperature on the transistors.

When combining the two effects outlined above, and by matching the effects on the inversion frequency due to the temperature effects of ferrite material with those of the counter-working temperature effects of the transistors' base-emitter junction, it is possible substantially to cancel any change in inversion frequency that otherwise might result from temperature changes occurring in a normally operating inverter circuit.

However, aside from any normally occurring changes in the inversion frequency, it is possible in a cost-effective and practical manner to cause substantial additional changes in the inversion frequency. Such changes can controllably be accomplished by way of providing a controllable flow of additional heat to the ferrite cores of the saturable feedback transformers; which is exactly what is accomplished by the two resistors identified as R1 and R2; which two resistors are coupled to the ferrite cores in close thermal relationship.

A given flow of power to the two resistors causes a corresponding proportional temperature rise of the ferrite material. Thus, the inversion frequency will increase from its base value in approximate proportion to the power input to the resistors.

In the circuit of FIG. 1, the purpose of controlling frequency is that of effecting control of the power output, which is accomplished by way placing a frequency-dependent or reactive element in circuit with the load. That way, as the frequency is varied, the flow of power to the load is varied in some corresponding manner.

For extra effective control, this reactive element can be a tuned circuit—as indeed is used in the arrangement of FIG. 1 —in which case the degree of power flow control for a given degree of frequency control is enhanced by the frequency-selective characteristics of the tuned circuit.

In the particular case of FIG. 1, with no power being provided to resistors R1 and R2, the power supplied to the fluorescent lamp load is approximately 30 Watt. With a power flow of about 1 Watt provided to resistors R1 and R2, the power supplied to the fluorescent lamp load is only about 4 Watt.

Thus, by controlling the amount of power being provided to control input terminals CIT, the light output of fluorescent lamp FL may be controlled over a wide range.

However, it should be realized that by controlling the light output of fluorescent lamp FL by way of controlling the temperature of the ferrite material in the feedback current transformers, as herein described, the response time can not be instantaneous. While such delayed response may be annoying in conventional light dimming applications, it is of little significance in several other important applications.

In particular, with reference to FIG. 3, the relatively long response time does not constitute a significant detriment in connection with controlling the light output against such effects as: i) changes in the magnitude of the voltage applied to the inverter from source S, ii) variations in the efficacy of the fluorescent lamp, whether these variations be due to lamp manufacturing differences or lamp aging, iii) variations in the ambient temperature to which the fluorescent lamp is subjected, and iv) variations in the ambient temperature to which the ballast itself is subjected.

More particularly, the ballast circuit of FIG. 3 illustrates how the circuit of FIG. 1 is used to provide for automatic control of the light output of the fluorescent lamp. In FIG. 3, the light output level is sensed by light sensor LS, which is of such nature that its effective resistance decreases as the light flux received by it increases. Thus, the voltage developing across adjustable resistor Ra increases with decreasing light output.

In particular, with reference to FIG. 3, the relatively long response time does not constitute a significant detriment in connection with controlling the light output against such effects as: i) changes in the magnitude of the voltage applied to the inverter from source S, ii) variations in the efficacy of the fluorescent lamp, whether these variations be due to lamp manufacturing differences or lamp aging, iii) variations in the ambient temperature to which the fluorescent lamp is subjected, and iv) variations in the ambient temperature to which the ballast itself is subjected.

More particularly, the ballast circuit of FIG. 3 illustrates how the circuit of FIG. 1 is used to provide for automatic control of the light output of the fluorescent lamp.

The light output level is sensed by light sensor LS, which is of such nature that its effective resistance decreases as the light flux received by it increases. Consequently, the voltage developing across adjustable resistor Ra increases with decreasing light output. Depending upon the chosen setting of Ra, with increasing light output, there comes a point at which the magnitude of the voltage across Ra gets to be so high as to cause current to flow through Zener diode Z2 and into the base of transistor Qa; which then causes power to be provided to resistors R1 and R2. In turn, the power provided to these resistors will cause heating of the ferrite cores of feedback transformers CT1 and CT2, thereby reducing the amount of power supplied by the ballast to the fluorescent lamp.

As an overall result, the light output from the lamp will be kept substantially constant at a level determined principally by the threshold provided in the control feedback loop; which threshold is determined by the sum of the voltage drop across the Z1 Zener diode and that of the base-emitter junction of transistor Qa.

Thus with adequate gain in the total feedback loop (which principally consists of elements LS, Ra, Z1, Qa, R1, R2, CT1, CT2 and the Thermal Coupling Means), the light output will be maintained at a substantially constant level characterized by the point at which the magnitude of the voltage across Ra reaches this threshold—that is, reaches a threshold high enough to cause current to flow through the Z1 Zener diode and into the base of transistor Qa.

If the light output level were to fall below this threshold, current would cease flowing through transistor Qa, and power flow to the ferrite cores will be choked off; thereby causing the cores to cool down and, as a result, more power to be provided to the lamp.

Whenever the light output is inadequate to cause the magnitude of the voltage across Ra to reach the threshold, base current ceases to be provided to Qa, and the magnitude of the voltage across Qa will reach its maximum level; which maximum level is principally determined by the magnitude of the voltage between the T— and the T+ terminals. In turn, this magnitude is determined by the voltage developing across the fluorescent lamp in combination with the voltage transformation ratio of transformer T.

The parameters of Zener diode Z2 and warning means WM are so chosen that power will be provided to warning means WM whenever the magnitude of the voltage across Qa reaches its maximum level; which means that a warning will be provided whenever the light output from fluorescent lamp FL fails to reach a certain level.

Although different types of devices may be used as warning means WM, it is herein anticipated that the warning means be a simple liquid crystal device parallel-loaded with a leakage resistor.

Or, the warning means could simply be a light-emitting diode, in which case the Zener diode may be substituted with a resistor.

FIG. 4 shows a fluorescent lighting fixture wherein a ballast B, made in accordance with the ballast circuit of FIG. 3, is positioned and connected with the fixture's fluorescent lamp(s) in a substantially ordinary manner.

A calibrated means for adjusting the magnitude of resistor Ra is accessible from the outside of the ballast.

Light sensor LS and warning means WM are each provided as an entity at one end of a light weight electrical cord; which cord has a plug at its other end. This plug is adapted to be plugged into a receptacle in the ballast itself, thereby to be properly connected in circuit with the feedback loop.

The complete feedback loop is electrically isolated from the power line and the main ballast circuit; which therefore readily permits both LS and WM, as well as their receptacles, cords and plugs, to be made and installed in accordance with the specifications for Class-2 or Class-3 electrical circuits, as defined by the National Electrical Code.

Light sensor LS is positioned in such a way as to be exposed to the ambient light within the fixture; warning means WM is placed in a location whereby it is readily visible from some suitable place external of the fixture; and ballast B is placed in such manner as to provide for Ra to be reasonably accessible for adjustment The main purpose of warning means WM, which represents a totally optional feature, is that of providing a visually discernable signal to the effect that it is time to change the lamp(s) in the fixture.

The main purpose of adjustable resistor Ra is that of permitting adjustment of the level of light to be provided from the fixture. Of course, as with LS and WM, Ra could just as well have been provided as a plug-in entity at the end of a light weight cord.

FIG. 5 illustrates ballast B in further physical detail, particularly showing how the light sensor can be included as a mechanically integral part of the ballast: being plugged into and physically held by recessed receptacle means RRM. Thus, there is no need to provide the light sensor on a cord (as indicated in FIG. 4), although in some applications it is definitely advantageous to do so. Instead, as indicated in FIG. 5, the light sensor can be rigidly combined with the rest of the ballast structure.

In most ordinary applications, with the light sensor as a mechanically integral part of the ballast, it is only necessary to mount the ballast in the fixture in such manner that part of the light from the fluorescent lamps will be intercepted by the light sensor—as illustrated by FIG. 6.

However, even if the ballast were to be mounted in separate compartment, it would only be necessary to provide an aperture between the ballast compartment and the compartment comprising the fluorescent lamps, and then to arrange for some of the lamp light to be intercepted by this aperture. Of course, it would also be necessary to mount the ballast in such a relationship with the aperture that the ballast's light sensor would intercept part of the light coming through the aperture.

As indicated in FIG. 6, providing the light sensor as a mechanically integral part of the ballast makes it particularly convenient to mount the ballast in the fixture—requiring no wiring other than that required with any ordinary ballast.

Additional Comments (a) When a fluorescent lamp is initially provided with power, its light output will be substantially lower than it will be once the lamp has warmed up to proper operating temperature. Under most normal circumstances, the ballast of FIG. 3 provides compensation for this effect, in that the lamp will automatically be provided with substantially more power as long as the light output is not up to the desired level.

During its initial warm-up period, the warning means may indicate a need to replace the lamp. However, the warning signal should be disregarded, or at least interpreted with special care, during this initial lamp warm-up period.

(b) In order for the feedback control loop to be considered as a Class-2 electrical circuit, it is convenient to limit the magnitude of the DC voltage provided between terminals T− and T+ to about 30 Volt. Also, the magnitude of the maximum current available therefrom should be limited to 8 Amp.

(c) To provide for even more accuracy in the control feedback function, the magnitude of the voltage provided between the B− and the B+ terminals could be regulated with a separate Zener diode. However, for most applications, the degree of voltage regulation provided by the fluorescent lamp should be adequate.

(d) Instead of providing just the light sensor as a separate plug-in entity, it would be just as feasible to provide almost the whole control circuit (elements FWR, Z1, Z2, WM, LS, Qa and Ra) as a plug-in entity; in which case the basic ballast would not be significantly cost-penalized for those who would wish to use the ballast without the feature of adjustable automatic light output control.

(e) The value of providing the ballast in the form illustrated by FIG. 5 is that it permits the ballast to be provided, mounted and used in a manner completely analogous to that of an ordinary ballast; yet, by simply providing a different version of the light sensor, the arrangement indicated in FIG. 4 can readily be accommodated.

(f) The man value associated with providing automatic light output control as herein described relates to energy-efficiency. For a specified level of light output, by compensating for line voltage fluctuations and lamp light output deterioration over time, an overall efficiency-advantage of nearly 20% is attained. Moreover, this 20% efficiency-advantage comes on top of the over 20% efficiency-advantage associated with using an electronic ballast in the first place.

(g) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:
    ballast circuit means connectable with a source of voltage and operable in a substantially non-dissipative manner to provide a current from an output as long as this output is connected with a gas discharge lamp, the current having adjustable magnitude, the ballast circuit means having a control input means receptive of luminous flux and operative in response thereto to effect adjustment of said magnitude; and
    mechanical structure and housing means operative to support and contain the ballast circuit means;
    thereby to render the combination of the ballast circuit means and the mechanical structure and housing means a mechanically integral and substantially rigid ballasting means suitable for use as a ballast within a lighting fixture or the like.

2. The arrangement of claim 1 wherein the control input means comprises: (i) control circuit means connected with the ballast circuit means and having receptacle means and (ii) light sensor means disconnectably connected with the control circuit means.

3. The arrangement of claim 1 combined with gas discharge lamp connected with the output and operative to: (i) receive the current, and (ii) provide luminous flux;
    such that part of the luminous flux is provided to the control input means, thereby to affect the magnitude of the current provided to the gas discharge lamp;
    thereby to control the amount of luminous flux provided by the gas discharge lamp.

4. The combination of:
    a ballast adapted to connect with a source of power and operable in a substantially non-dissipative manner to provide an alternating current from a ballast output as long as a gas discharge lamp is connected therewith, the alternating current having a magnitude and a frequency, the frequency being substantially higher than that of the voltage on an ordinary electric utility power line, the ballast having control input means operative, on receipt of an electrical control input having an amplitude, to effect control of the magnitude, the control input means being substantially non-responsive to any variations in the amplitude of the control input of frequency equal to or higher than the frequency of the alternating current; and
    light sensor connected with the control terminals, the light sensor being receptive of luminous flux and operative in response thereto to provide said electrical control input;
    whereby the average luminous flux, as averaged over a period longer than the period of the alternating current, received by the light sensor is operative to control the magnitude of the alternating current provided by the ballast output.

5. The combination of claim 4 wherein: (i) the ballast comprises an integral housing, and (ii) the control terminals are accessible from the outside of this housing by way of a recessed receptacle means.

6. The combination of claim 5 wherein the light sensor is operative to be received and held by the recessed receptacle means.

7. The combination of:
    housing means having an outer surface comprising receptacle means operative to receive and hold a plug means;
    ballast circuit means comprised within the housing means, the ballast circuit means: (i) being connectable with a source of electric power, (ii) having control terminal means connected with said receptacle means, and (iii) being operable to provide an alternating output current at a ballast output, the output current having a period and a magnitude, the magnitude being affected by the average of the amplitude of a control input provided to the control terminal means while being non-affected by any variations in this amplitude to the extent that such variations occur over a period shorter than the period of the output current; and
    light sensor means combined with said plug means and operative, in response to receiving a flux of illumination, to provide said control input;
    whereby the magnitude of the output current is affected by the light intercepted by the light sensor means.

8. The combination of claim 7 wherein the light sensor means is rigidly combined with the plug means.

9. The combination of claim 7 wherein the receptacle means is recessed into the outer surface.

10. The combinations of:
housing means having an outer surface;
ballast circuit means comprised within the housing means, the ballast circuit means: (i) being connectable with a source of electric power, (ii) having control terminal means, and (iii) being operable in a substantially non-dissipative manner to provide an output current at a ballast output, the output current having a magnitude affected by a control input provided to the control terminal means; and
light sensor means connected with the control terminal means and operative, in response to receiving a flux of illumination, to provide said control input, the light sensor means being comprised substantially within said outer surface;
the housing means, the ballast circuit means, and the light sensor means being combined and integrate in such manner as to constitute an integral ballast suitable for use in a lighting fixture for powering a gas discharge lamp.

11. An arrangement comprising:
housing means having an outer surface, the outer surface having optical aperture means operative to receive luminous flux; and
ballast circuit means comprised substantially within the housing means and: (i) being connectable with a source of electric power, (ii) having control input means responsive to said luminous flux, and (iii) being operable in a substantially non-dissipative manner to provide an output current at a ballast output, the magnitude of the output current being affected by the luminous flux received at said aperture means;
the housing means and the ballast circuit means being combined and integrated in such manner as to constitute a mechanically integral ballast suitable for use in a lighting fixture for powering a gas discharge lamp.

12. The arrangement of claim 11 wherein the magnitude of the output current decreases with an increasing amount of luminous flux.

13. The arrangement of claim 12 wherein the control input means comprises threshold means operative to make the magnitude of the output current decrease only after the luminous flux received at the aperture means exceeds a predetermined threshold level.

14. The arrangement of claim 13 wherein the threshold means has adjustment means operative to permit adjustment of the threshold level.

15. The arrangement of claim 11 combined with gas discharge lamp means connected with the ballast output and powered by the output current provided thereat, the gas discharge lamp means being operative to emit luminous flux, part of which is received by the aperture means.

16. Tho combination of claim 15 incorporated into a lighting fixture means in such manner that most of the luminous flux received by the aperture means has originated from within the lighting fixture.

17. The combination of claim 15 wherein most of the luminous flux received by the aperture means comes form the gas discharge lamp means.

18. The combination of claim 17 wherein by the luminous flux emitted by the gas discharge lamp means is controlled to be substantially constant irrespective of changes in the luminous efficacy of the gas discharge lamp means.

19. A ballast for a gas discharge lamp, comprising:
ballast housing means having an optical aperture means, the ballast housing means having an outer surface, the optical aperture means being substantially flush with the outer surface;
input conductor means leading into the ballast housing means and operative to permit connection with the voltage on an ordinary electric utility power line;
output conductor means leading from the ballast housing means and operative to permit connection with a gas discharge lamp; and
ballast circuit means comprised within the ballast housing means, the ballast circuit means: (i) being connected with the input conductor means and operative to draw power therefrom, (ii) being connected with the output conductor means and operative to provide an alternating current thereto, and (iii) having control means operative, in response to light flux received at said aperture means, to control the magnitude of the alternating current;
whereby the ballast, including its optical aperture means and its control means, constitutes a substantially rigid mechanically integral entity suitable for installation and use in an ordinary lighting fixture and operable to power a gas discharge lamp mounted therein.

20. The ballast of claim 19 wherein the control means is non-responsive to any changes in the magnitude of any light flux received by way of the optical aperture to the extend that such changes occur within a period not substantially longer than the duration of a complete period of the alternating current.

* * * * *